US009456320B2

(12) United States Patent
Jacquin

(10) Patent No.: US 9,456,320 B2
(45) Date of Patent: Sep. 27, 2016

(54) SYSTEM AND METHOD FOR SIMULTANEOUSLY SENDING A MESSAGE WITH A CALL TO A MOBILE DEVICE

(71) Applicant: Jeff Jacquin, Los Angeles, VA (US)

(72) Inventor: Jeff Jacquin, Los Angeles, VA (US)

(*) Notice: Subject to any disclaimer, the term of this patent is extended or adjusted under 35 U.S.C. 154(b) by 337 days.

(21) Appl. No.: 13/925,560

(22) Filed: Jun. 24, 2013

(65) Prior Publication Data

US 2014/0378173 A1    Dec. 25, 2014

(51) Int. Cl.
*H04W 4/14*    (2009.01)

(52) U.S. Cl.
CPC ...................... *H04W 4/14* (2013.01)

(58) Field of Classification Search
CPC ......... H04W 4/12; H04W 4/14; H04W 4/16; H04W 4/18; H04W 4/22; H04W 4/003; H04W 4/05; H04W 4/20; H04W 76/02; H04W 76/005; H04W 76/028
USPC ............................ 455/466, 412.1, 412.2, 567
See application file for complete search history.

(56) References Cited

U.S. PATENT DOCUMENTS

| | | | |
|---|---|---|---|
| 5,711,012 A | 1/1998 | Bottoms et al. | |
| 5,832,065 A | 11/1998 | Bannister et al. | |
| 6,112,084 A | 8/2000 | Nikos | |
| 6,310,944 B1 | 10/2001 | Brisebois et al. | |
| 8,489,072 B1* | 7/2013 | Ding | 455/411 |
| 2002/0065097 A1* | 5/2002 | Brockenbrough et al. | 455/552 |
| 2003/0069874 A1* | 4/2003 | Hertzog et al. | 707/1 |
| 2003/0219107 A1 | 11/2003 | Richardson et al. | |
| 2004/0015504 A1* | 1/2004 | Ahad et al. | 707/100 |
| 2004/0224694 A1* | 11/2004 | Zhao et al. | 455/445 |
| 2005/0143103 A1* | 6/2005 | Bjorgan | H04M 3/42051 455/466 |
| 2005/0204007 A1* | 9/2005 | McGregor et al. | 709/206 |
| 2006/0234693 A1* | 10/2006 | Isidore | H04M 1/72519 455/422.1 |
| 2007/0293199 A1* | 12/2007 | Roundtree | G06F 9/45512 455/414.1 |
| 2008/0187108 A1* | 8/2008 | Engelke et al. | 379/52 |
| 2010/0297979 A1* | 11/2010 | Watfa et al. | 455/404.1 |
| 2011/0090898 A1* | 4/2011 | Patel et al. | 370/352 |
| 2013/0178237 A1* | 7/2013 | Manyakin et al. | 455/466 |

FOREIGN PATENT DOCUMENTS

| | | |
|---|---|---|
| CN | 1512806 A | 7/2004 |
| CN | 1716968 A | 1/2006 |
| EP | 1003344 A2 | 5/2000 |

* cited by examiner

*Primary Examiner* — George Eng
*Assistant Examiner* — Ki Ha Nam
(74) *Attorney, Agent, or Firm* — Michael N. Cohen; Cohen IP Law Group P.C.

(57) ABSTRACT

A system and method for sending a message to a second mobile device of a second user from a first mobile device of the first user while making a call comprises the first mobile device having a mobile application installed and operating in communication with a server to send the message to the second mobile device while attempting the call. The second mobile device receives the call from the first mobile device with the message displayed on a display area by the mobile application. The mobile application communicates with the server and the first mobile device and the second mobile device to enable simultaneously sending the message with the call from the first mobile device and to enable simultaneously viewing the message with a received call in the second mobile device.

12 Claims, 6 Drawing Sheets

SYSTEM AND METHOD FOR SIMULTANEOUSLY SENDING A MESSAGE WITH A CALL TO A MOBILE DEVICE

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE DISCLOSURE

The present disclosure relates generally to a system and a method of mobile communication and more particularly to a system and a method for transmitting and receiving a text message prior to or during a phone call.

DISCUSSION OF RELATED ART

A wide variety of communicating devices are currently available and the field continues to develop, especially in mobile communicating devices to improve functionality. One of the most popular developments in the communicating technologies is the display of a text message during a phone call. A caller can enter and send the text message to a receiver by entering the receiver's number. The text message allows a caller to communicate when the receiver is unable to communicate audibly, or when the receiver is in a noisy environment. But the display of such details may not provide sufficient information to the receiver to determine whether or not to accept the call. Also, during long audible communication, sometimes the caller may forget some important points of a conversation. Simultaneous text messaging enables the transfer of small, clear and meaningful messages that are the core points of communication. So text messages can play an important role in enabling the receiver to confirm the purpose of the call.

The prior art contains several communicating devices capable of transmitting text messages along with the call, but each of the existing devices have one deficiency or another. For example, a device that enables the users to send and receive a message in different formats may include a text message gateway, an audio message gateway, and a processor. The processor may be configured to convert text messages received at the text message gateway into audio messages and then to send the audio messages via the audio message gateway. The processor may also be configured to convert audio messages received at the audio message gateway into text messages and then to send the text messages via the text message gateway. However, this device only changes the text message into the respective audio message or audio message into the respective text message. This device cannot transmit audio message and text message simultaneously.

In another case, a method of phone messaging includes encoding a data packet into an audio stream. The data packet comprises a message addressed to a mobile device operating in a wireless network. A call is placed to the mobile device using a voice channel of the wireless network, transmitting the audio stream over the voice channel to the mobile device, and reconstructing the data packet from the audio stream. But several problems can arise with these types of messaging systems. In such a system, the data packet is placed in the audio stream by side-stepping the audio stream. In this method when the data packets are transferred through the voice channel the audio signals are not transferred. By this method only one type of data can be sent at a time.

In another case, a text messaging system conveys text messages between a sender and a recipient in a wireless carrier network. A sender mobile handset includes manual input for identifying text characters in a message to be sent to the recipient and an audio-band encoder coupled to the manual input for representing the text characters with a keyed modulation stream. The keyed modulation stream is transmitted over a non-signaling channel of the wireless carrier network to a base station. At least one mobile switching center in the wireless carrier network transports the message between the sender mobile handset and the recipient mobile handset. A recipient mobile handset including a display interface and a display receives the decoded text and displays the text characters of the message to the recipient. However, the text messages unlike voice communication are not delivered from the sender to the recipient in real-time. The sent text message is stored within the short message system implemented in the system until the recipient's mobile device can receive the text message.

In light of the foregoing, there is a need for a system or method that displays a text message along with the incoming call. Such a needed system would allow the receiver to know the purpose of the call before answering the call. Further, the present system would allow an easy exchange of information prior to and after the call. Such a needed device would be capable of sending messages even when the receiver is unable to respond at the time of the call. The present embodiment accomplishes these objectives.

SUMMARY OF THE DISCLOSURE

The present embodiment is a system and method for simultaneously sending a message with a call to a mobile device that will send a message simultaneously with the call. The application, which can be installed to a mobile electronic device, for simultaneously sending a message with the call to a mobile device is hereinafter called as Phonote app. When placing a call to a member of the user's contacts a screen will appear that will allow the user to create a message to be sent to the receiver. When the phone rings on the receivers phone the message the Phonote user typed in will appear on the receiver's phone. This allows the receiver to know what the call is about before they pick it up.

The present embodiment is a system and method for sending a message to a second mobile device of a second user from a first mobile device of the first user while making a call. The system comprises the first mobile device having a mobile application installed and operating in communication with a server to send the message to the second mobile device while attempting the call. The second mobile device receives the call from the first mobile device with the message displayed on a display area by the mobile application. The mobile application may be running in a background of the first mobile device and/or the second mobile device while attempting the call or receiving the call. The server operates in communication with the first mobile device and the second mobile device over a wireless communication network. The mobile application communicates with the server and the first mobile device and the second mobile device to enable simultaneously sending the message with the call from the first mobile device and to enable simultaneously viewing the message with a received call in the second mobile device. The server redirects the message send from the first mobile device to the second mobile device. The mobile application, also known as the phonote application, running on the second mobile device displays the message on the display area while receiving the call from the first mobile device.

Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

The following describes example embodiments in which the present invention may be practiced. This invention, however, may be embodied in many different ways, and the description provided herein should not be construed as limiting in any way. Among other things, the following invention may be embodied as methods or devices. As such, the present invention may take the form of an entirely hardware embodiment, an entirely software embodiment, or an embodiment combining software and hardware aspects. The following detailed descriptions should not be taken in a limiting sense.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Figure 1:
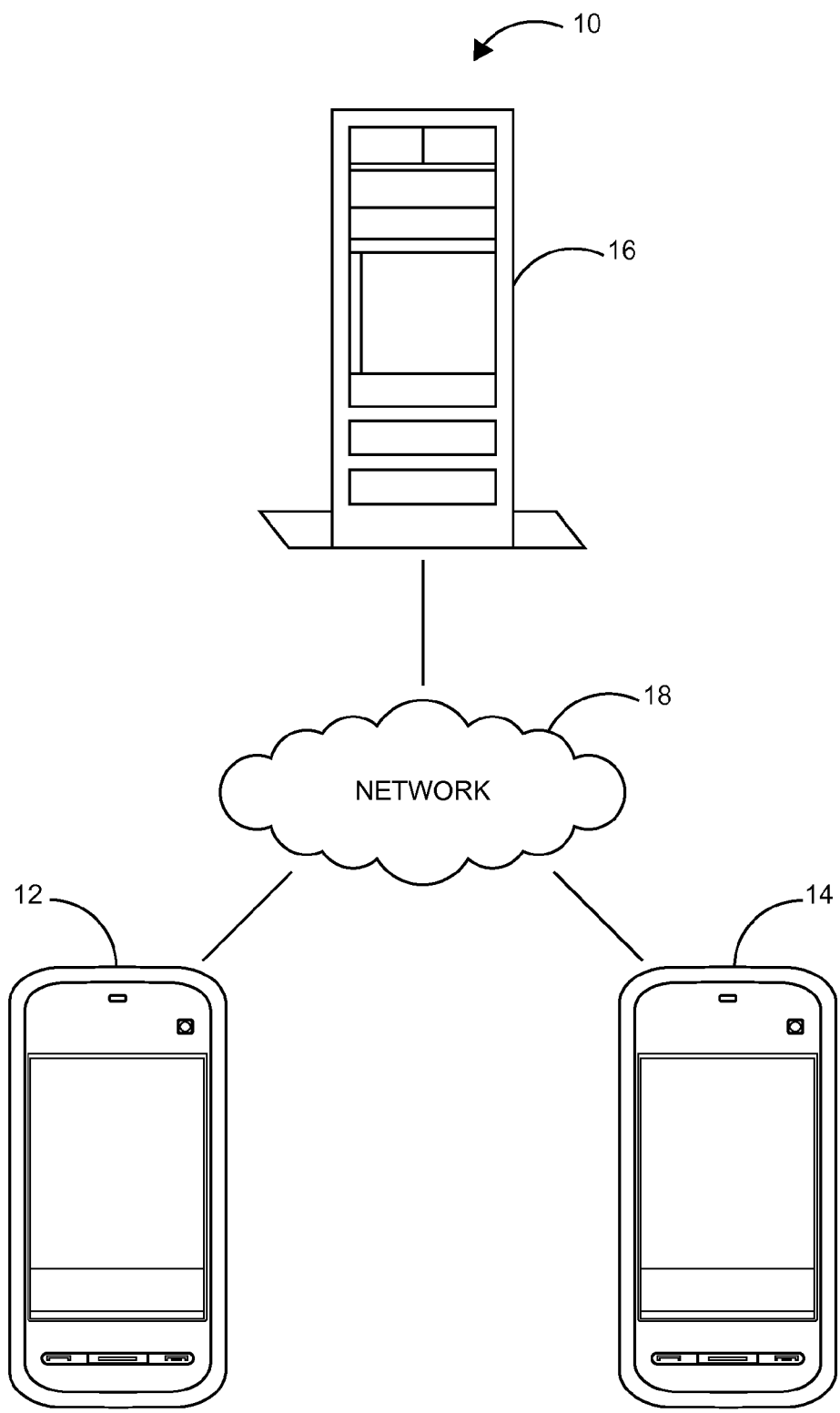
FIG. 1 illustrates an exemplary system according to a preferred embodiment of the present invention.

Referring to FIG. 1, a system 10 for sending a message to a second mobile device 14 of a second user from a first mobile device 12 of the first user while making a call comprises the first mobile device 12 having a mobile application installed and operating in communication with a server 16 to send the message to the second mobile device 14 while attempting the call. The second mobile device 14 receives the call from the first mobile device 12 with the message displayed on a display area by the mobile application. The mobile application may be running in a background of the first mobile device 12 and/or the second mobile device 14 while attempting the call or receiving the call. The server 16 operates in communication with the first mobile device 12 and the second mobile device 14 over a wireless communication network 18. The mobile application communicates with the server 16 and the first mobile device 12 and the second mobile device 14 to enable simultaneously sending the message with the call from the first mobile device 12 and to enable simultaneously viewing the message with a received call in the second mobile device 14. The server 16 redirects the message send from the first mobile device 12 to the second mobile device 14. The mobile application also known as the phonote application, running on the second mobile device 14 displays the message on the display area while receiving the call from the first mobile device 12.

According to a preferred embodiment of the present invention the message is sent to a message-recipient i.e. the second mobile device 14. The message can be any message that can be transmitted to one or more mobile devices of message-recipients. In one embodiment, the message comprises one or more of: may text, graphics, audio, or video. Optionally, the message describes a product or service. Optionally, the message is an offer for sale of a product or service. In one embodiment, the message is a message comprising text, graphics, a push notification, a Short Message Service (SMS) message, or a Multimedia Messaging Service (MMS) message. The push notification is optionally any message sent to a mobile phone from a message server using an internet protocol.

A system 10 of the invention comprises the wireless communications network 18 ('network') to connect the server 16 and one or more mobile device users. The network 18 can be any network that can transmit the data disclosed herein between the servers, the mobile devices, and any optional data-processing devices. Useful networks include wireless networks, wired networks, and a combination thereof. In one embodiment, the network 18 comprises a wide area network (WAN) or a local area network (LAN). In one embodiment, the network 18 comprises a wide area network (WAN). Optionally, the WAN comprises the internet. Optionally, the WAN comprises a wireless WAN such a cellular network. Optionally, the WAN comprises the internet and a wireless WAN (e.g. cellular network).

In an embodiment of the present invention is a Phonote app for the android system that will send the message simultaneously with the call. When placing the call to a member of the user's contacts a screen will appear that will allow the user to create a message to be sent to the receiver. When the phone rings on the receivers phone the message the Phonote user typed in will appear on the receiver's phone. This allows the receiver to know what the call is about before they pick it up.

First, the call is initiated a BroadcastReceiver within the android application determines if the phone number being called is owned by another Phonote user. The check occurs in two stages: first through a search for the phone number in a locally stored cache; or if not found in the cache or the cache is expired, the app will perform a HTTP request that contains the dialed phone number over the user's active internet connection to the Phonote server. The server will respond with a message stating whether the phone number belongs to a device that has Phonote installed.

If the receiver does not have Phonote installed, the app will restart the phone call and let the Android system take over. If the receiver has Phonote installed, the app will display a dialog prompting the user for a message. After the message is written the app will perform another HTTP request to the Phonote server with destination phone number and message content. The call is then restarted. On the receiving phone, the app registers another BroadcastReceiver that is notified on incoming calls and either a push notification will be sent from the server to the receiver's device, or the receiver's app may make a HTTP or TCP socket request to the Phonote server upon notification of an incoming call, and will check for pending messages.

In one embodiment, the network 18 comprises a wireless network. Optionally, the wireless network comprises a cellular network, a wireless local area network, or a wireless metropolitan area network. In one embodiment, the network 18 comprises a cellular network. Useful cellular networks include Advanced Cellular telephone System (AMPS), Narrowband Advanced Cellular telephone Service (NAMPS), Frequency Shift Keying (FSK), Frequency Division Multiple Access (FDMA), Time Division Multiple Access (TDMA), and Code Division Multiple Access (CDMA), or any standard, such as Global System for Mobile communications (GSM) or Cellular Digital Packet Data (CDPD), a GPRS network, an EDGE network, a 3G network, and a 4G network. The network 18 can use any network protocol, for example, an internet protocol, TCP/IP user datagram protocol (UDP), or hypertext transfer protocol (HTTP), which are commonly used over the internet.

According to the present invention, the mobile device is any portable device having a user module configured to provide a graphic user interface (GUI), e.g. for displaying a message, user input device, a display and a wireless network adapter. Examples of mobile devices include a mobile phone, a handheld gaming system having calling features, a personal digital assistant (PDA), a tablet PC, a cellular phone, a smart phone, and a portable email device. In one embodiment, the mobile device is a cellular device. Optionally, the mobile device is a cellular device, wherein the cellular device is a cellular telephone or a cellular-enabled PDA or tablet PC (e.g. iPad™). The display area can be any output device that produces a graphic viewable by the user.

The system 10 of the invention comprises the server 16 which can be configured in any manner that provides access to a database. The database and server can be configured in any manner that provides information for identifying mobile device users (message recipients) having the mobile application of the present invention and the respective recipients devices or contacts in communication with each mobile devices. The server 16 of the present invention can comprise a message sending module for sending the message to a recipient while receiving a call. In one embodiment, the message sending module is configured to send the message received from the first mobile device 12 to a message-recipient or the second mobile device 14.

The mobile application of the present invention attaches short messages to each call made by the first user of the first mobile device 12, which can be read by the second user or the recipient of the second mobile device 14 before answering the call. This feature of the present invention is easy to use and in addition can change the way people make phone calls from mobile devices installed with the mobile application.

Figure 2A:
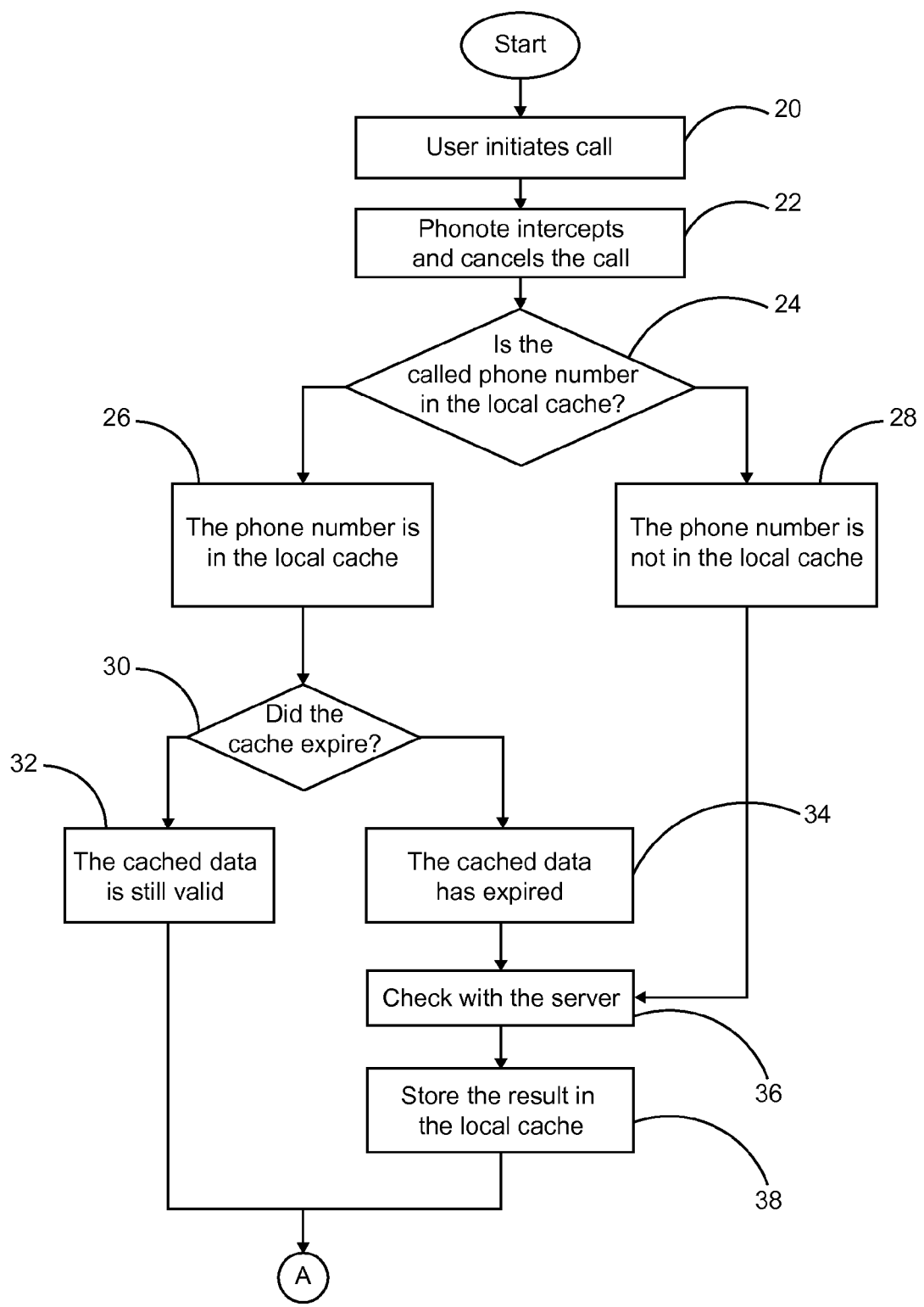
FIGS. 2A-2B illustrate a flowchart for simultaneously sending a message with a call to a first mobile device.
Figure 2B:
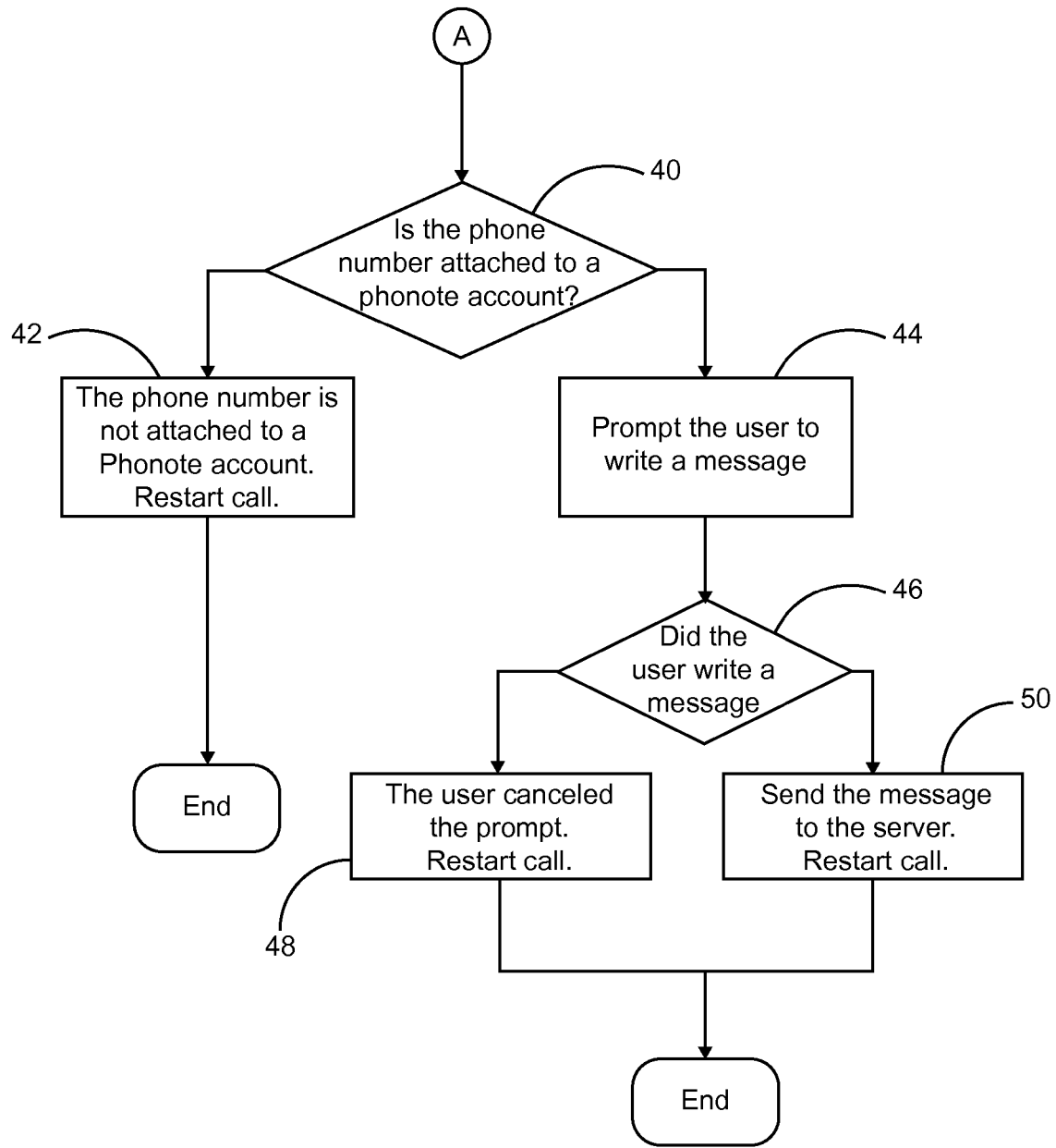

As shown in FIG. 2A-2B a flowchart for simultaneously sending the message with the call to the first mobile device 12 is illustrated. When the first user of the first mobile device 12 initiates a call to a number, or a contact saved in the memory of the first mobile device 12, the mobile application running in a background of the first mobile device 12 is launched automatically as shown in blocks 20 and 22. When the first user hit a call button of the first mobile device 12 for initiating the call from the first mobile device 12 to the second mobile device 14 of a second user, the mobile application acquires control of calling feature or function in the mobile operating system to send the message set by the first user to the second mobile device 14. The mobile application installed on the first mobile device 12 intercepts and interrupts the call to the second mobile device 14 of the second user. The mobile application then searches for identifying the contact number of the second user's mobile device 14 installed with the mobile application. For operating the simultaneous messaging feature of the mobile application, both the first mobile device 12 and the second mobile device 14 must be installed with the mobile application. The mobile application identifies the contact number by searching for the contact number of the second user's mobile device 14 within a local cache of the mobile device 12 of the first user as shown in block 24. If the contact number is obtained from the stored local cache as shown in block 26, which indicates that a recent call is made to the same number. If the local cache is expired then the search for identifying the contact number may not yield any successful results as in block 30 and 34. While checking the mobile device associated with the contact number for the mobile application that may be retrieved from the local cache of the first mobile device 12. Even if the cached data from the local cache includes the contact number of the second user, the mobile application checks to confirm that the cached data is still valid or not as shown in block 32. If the contact number is not retrieved from the first mobile device 12, and from the local cache as shown in block 28, the mobile application checks with the server 16 for any stored contacts in as shown in block 36. The mobile application communicates with the server 16 through an active internet connection of the mobile device. The contact number retrieved from a stored database of the server 16, is then stored in the local cache of the first mobile device 12 as shown in block 38.

Referring back to FIG. 2B, after identifying the contact number from a phonote account in the server 16, the server 16 interacts with the first mobile device 26 and the mobile application or phonote application to start the messaging operation as shown in block 40. The phonote application prompts the first user of the first mobile device 12, to write a message on the display area of a writing widow displayed on the first mobile device 12 as shown in block 44. A full screen window may pop up to write a short message, the message may be as long as 30 characters in length. The first user is provided with different options including options for placing call without writing any message in the display area. After ensuring whether the user wrote the message in the mobile application display area as shown in block 46, the mobile application may start the call to the contact number. If the user opts to cancel the message input prompt from the first mobile device 12, the mobile application restarts the call by transferring the call control directly to the mobile operating system, without any messaging services as shown in block 48. If the user enters the message to be displayed on the second mobile device 14, the mobile application will send the message entered by the first user in the popped up display area to the server 16 as shown in block 50. The server 16 is in communication with the mobile devices of the first user and the second user over the wireless communication network. Finally, as shown in block 42, when the search for identifying the contact number of the second mobile device 14 returns zero results, the mobile application confirms that the second mobile device 14 do not have the phonote application installed on it cannot send the message to the second mobile device 14. In an embodiment, the mobile application may display options including performing a voice call to the second mobile device 14, sending the mobile application link to the second mobile device through email or push messages. The mobile application will then restart the call and the mobile operating system takes control of the call directly to the second mobile device.

Figure 3:
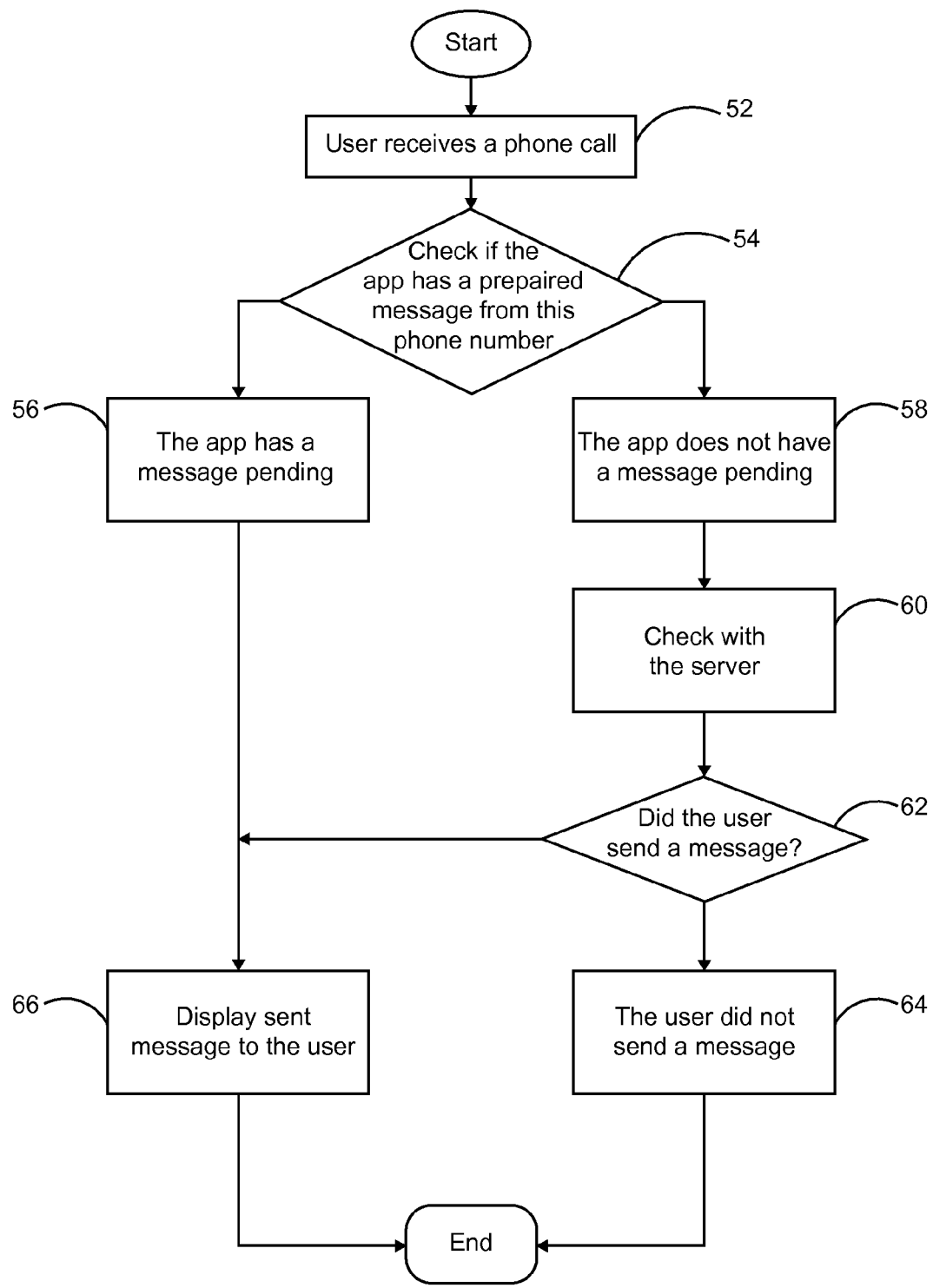
FIG. 3 illustrates a flowchart for simultaneously receiving and viewing the message with the call in a second mobile device.

Referring to FIG. 3, a flowchart for simultaneously receiving and viewing the message with the call in the second mobile device 14 is illustrated. As shown in block 52, when the call is received in the second mobile device 14 of the second user from the first mobile device 12, the mobile application i.e., the phonote application running on the background of the second mobile device 14 checks if the mobile application has received any messages from the caller or the first mobile device 12 as shown in decision box 54. Now, as in block 56, if the mobile application in the second mobile device 14 includes any pending messages, those gets displayed on a temporary display area or pop up window provided by the mobile application running on the background of the second mobile device 14 mobile device of the second user as shown in block 66. If the mobile application do not have any pending messages from the first user as shown in block 58, the phonote or mobile application communicates with the server 16 through an active internet connection of the second mobile device 14 for checking for the any pending messages from the first mobile device 12 stored in the server 16 while receiving the call on the second mobile device 14 as shown by block 60. The active internet connection for communication is done through third generation (3G), fourth generation (4G) or Wi-Fi. The server 16 determines any pending or active messages from the first user as in block 62 and if there are no active or pending messages, the mobile application will not display a pop up window for the message. The mobile application will not provide any controls to the users of the second mobile devices 14, while viewing the message. The pop up window may be a temporary semi transparent window only for displaying the messages. The mobile application allows the second user to answer the call from the first user while simultaneously displaying the message on the temporary display area.

Figure 4:
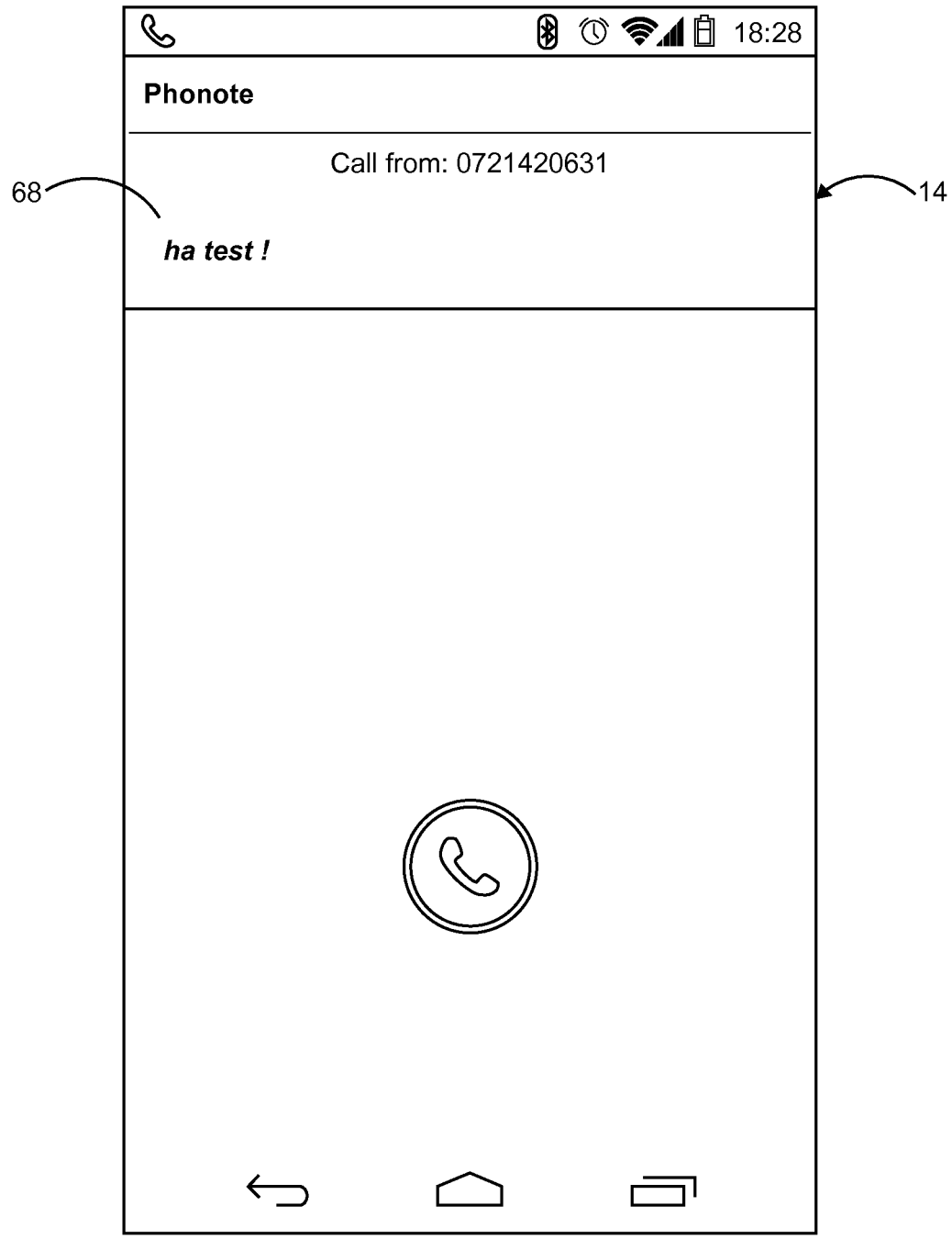
FIG. 4 illustrates the message displayed on the second mobile device while simultaneously receiving the call according to a preferred embodiment of the present invention.

FIG. 4 illustrates the message displayed on the second mobile device 14 while simultaneously receiving the call according to a preferred embodiment of the present invention. The mobile application running on the mobile device of the second user checks with the server 16 by making a HTTP and/or transmission control protocol (TCP) socket request to the server upon notification of an incoming call, and will check for pending messages. The message includes the contact number of the first user displayed on the display area 68 along with the message. The messages are sent through a push notification sent from the server 16 to the second user's mobile device 14. The mobile application running on the mobile device of the second user allows the user to answer the call even in the absence of any pending messages from the first user. The display area may be provided through a pop up window, which has semi-transparency and is placed on a top area of the mobile user interface having no underlying buttons. In an embodiment, the pop up window position can be customized by the user and the window is non interactive with the user enabling the user to only view the message.

Figure 5:
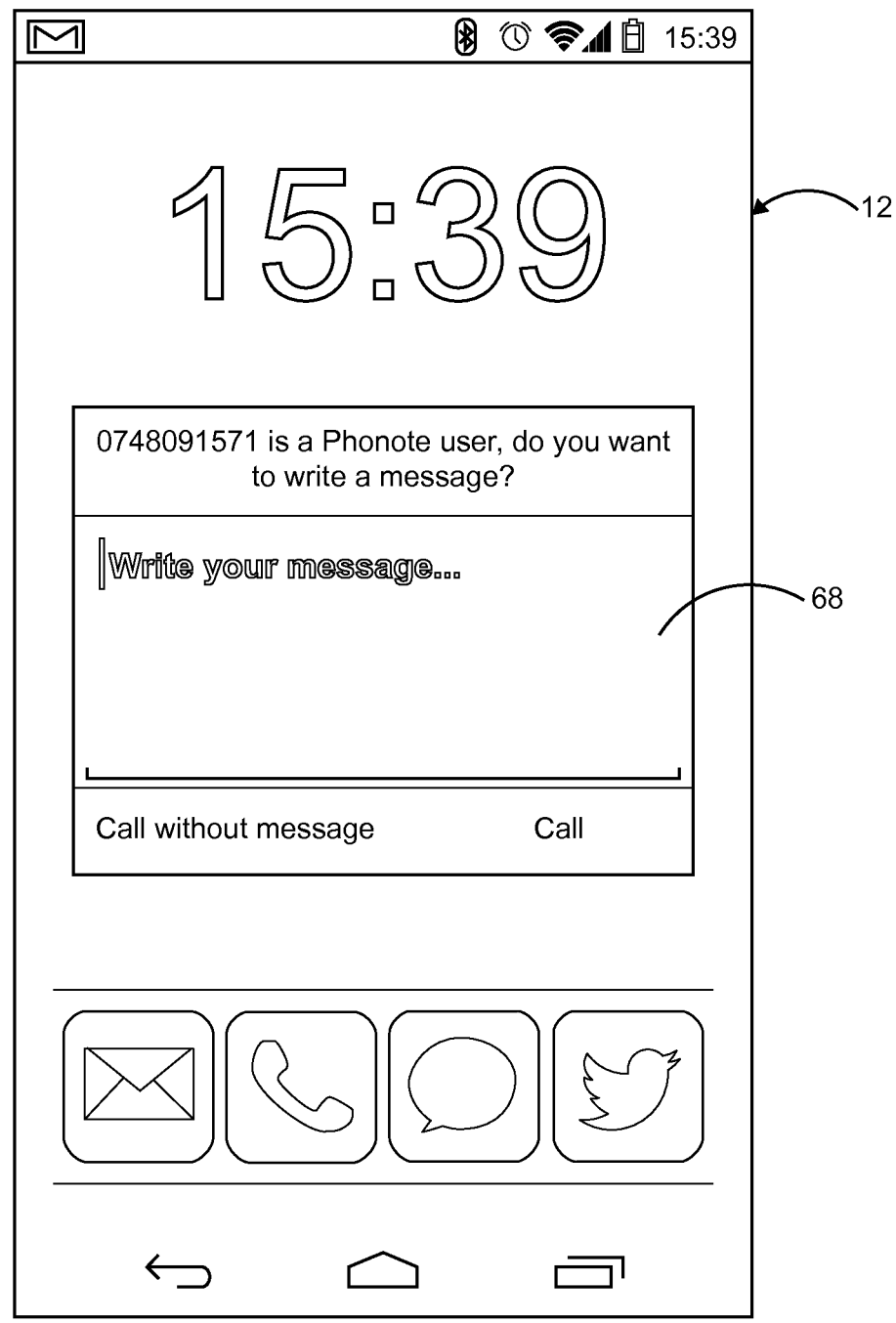
FIG. 5 illustrates a display area on the first mobile device for writing the message while making the call according to a preferred embodiment of the present invention.

FIG. 5 illustrates a display area on the first mobile device 12 for writing the message before making the call according to a preferred embodiment of the present invention. The mobile application performs a hypertext transfer protocol (HTTP) request containing the contact number of the second user's mobile device over the wireless communication network to the server 16. The server 16 responds to the first user's mobile device with a message stating whether the contact number belongs to the second user's mobile device is installed with the mobile application. The mobile application installed in the first user's mobile device prompt the first user to enter the message within the display area 68, thereafter the mobile application performs another HTTP request to the server 16 with the contact number and a message content provided by the mobile application. Now, the first mobile device 12 of the first user restarts the call after sending the message to the server 16. The mobile application i.e. the phonote application running on the first mobile device and the second mobile device is in communication with the server over the wireless communication network for managing a simultaneous messaging and calling feature.

While a particular form of the invention has been illustrated and described, it will be apparent that various modifications can be made without departing from the spirit and scope of the invention. For example, the mobile application may allow transfer of picture including animated graphics according to user preferences. Accordingly, it is not intended that the invention be limited, except as by the appended claims.

What is claimed is:

1. A method for simultaneously sending a message with a call to a mobile device comprising:
   initiating the call from a first mobile device by a first user to a second mobile device of a second user;
   automatically launching a mobile application installed on the first mobile device to intercept and interrupt the call to the second mobile device, the mobile application searches for identifying a contact number of the second mobile device installed with the mobile application, the mobile application identifies the contact number by searching for the contact number of the second mobile device within a local cache of the mobile device of the first user;
   checking the second mobile device associated with the contact number for the mobile application, the contact number being retrieved from the local cache of the first mobile device;
   prompting the first user to write the message within a display area provided by the mobile application;
   sending the message to the second mobile device through a server, the server being in communication with the first mobile device and the second mobile device over a wireless communication network;
   restarting the call to the second mobile device;
   receiving the call by the second mobile device from the first mobile device;
   automatically launching the mobile application installed on the second mobile device from a background to check for at least one pending messages from the first mobile device of the first user;
   displaying the at least one pending message from the first mobile device on the display area provided by the mobile application running on the background of the second mobile device; and
   allowing the second user to answer the call from the first user while simultaneously displaying the message on the display area.

2. The method of claim 1 further comprising:
   searching for identifying the contact number of the second mobile device from a list of contact numbers stored in the server if the contact number of the second mobile device is not stored within the local cache of the mobile device of the first user;

storing the contact number identified from the list of contact numbers in the local cache of the first mobile device;

checking the second mobile device associated with the contact number for the mobile application, the contact number being identified from the list of contact numbers;

prompting the first user to write the message within the display area provided by the mobile application;

sending the message to the second mobile device through the server; and restarting the call to the second mobile device.

3. The method of claim 1 wherein the mobile application installed in the first mobile device searches for identifying the contact number of the second mobile device within the list of contact numbers in the server upon expiration of the local cache of the first mobile device.

4. The method of claim 1 wherein the mobile application performs a hyper text transfer protocol (HTTP) request containing the contact number of the second mobile device over the wireless communication network to the server.

5. The method of claim 1 wherein the server responds to the first mobile device with a message stating whether the contact number belongs to the second mobile device is installed with the mobile application.

6. The method of claim 1 wherein the mobile application installed in the first mobile device restart the call upon finding that the second mobile device is not installed with the mobile application, the mobile application allows a mobile operating system take over to complete the call.

7. The method of claim 1 wherein the mobile application installed in the first mobile device prompt the first user to enter the message within the display area, thereafter the mobile application performs another HTTP request to the server with the contact number and a message content provided by the mobile application.

8. The method of claim 1 wherein the first mobile device restarts the call after sending the message to the server.

9. The method of claim 1 further comprising:

checking for the at least one pending messages from the first mobile device in a server while receiving the call on the second mobile device from the first mobile device;

displaying the at least one pending message from the first mobile device on the display area on the second mobile device by the mobile application running on the background; and allowing the second user to answer the call from the first user while simultaneously displaying the message on the display area.

10. The method of claim 1 wherein the mobile application running on the second mobile device checks with the server by making a HTTP and/or transmission control protocol (TCP) socket request to the server upon notification of an incoming call to find any pending message.

11. The method of claim 1 wherein the at least one pending message is send through a push notification sent from the server to the second mobile device.

12. The method of claim 1 wherein the mobile application running on the second mobile device allows the user to answer the call even in the absence of any pending messages from the first user.

* * * * *